Patented July 6, 1937

2,086,031

UNITED STATES PATENT OFFICE 2,086,031

DISAZO DYESTUFFS

Karl Holzach and Bernd v. Bock, Ludwigshafen-on-the-Rhine, and Heinrich Ohlendorf and Erich Baumann, Dessau, Germany, assignors to General Aniline Works, Inc., New York, N. Y., a corporation of Delaware No Drawing. Application May 23, 1934, Serial No. 727,202. In Germany May 31, 1933

3 Claims. (Cl. 260—81)

The present invention relates to valuable disazo dyestuffs and a process of producing same.

We have found that dyestuffs which are especially suitable for dyeing cellulose esters are obtained by preparing secondary disazo dyestuffs free from sulphonic and carboxylic groups while employing an amine of the benzene series capable of being coupled and having at least one hydroxyalkyl group attached to the nitrogen atom, as the terminal component.

The dyestuffs obtained correspond to the general formula

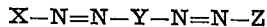

X—N=N—Y—N=N—Z wherein X is an aromatic radicle (preferably of the benzene or naphthalene series and which may be substituted by any substituent except sulphonic and carboxylic groups, for example by alkyl, nitro, alkoxy, hydroxyalkyl groups or by halogen), wherein Y is a radicle which is derived from an arylamine (preferably of the benzene or naphthalene series) capable of coupling in para-position to the amino group and which may be substituted by any substituent except sulphonic and carboxylic groups, for example by alkyl, nitro, alkoxy, hydroxyalkyl groups or by halogen, wherein the two —N=N— groups are attached to para-positions of the radicle Y, and wherein Z is a radicle of the benzene series which may be substituted by any substituent except sulphonic and carboxylic groups, for example by alkyl, nitro, alkoxy, hydroxyalkyl groups or by halogen and which contains an amino group to which at least one hydroxyalkyl group is attached. Very valuable dyestuffs are those in which X is a para-nitrated benzene radicle, Y a methylated benzene radicle and Z the radicle of an aniline containing one hydroxyalkyl group attached to the amino nitrogen atom and methylated in the meta-position, for example the radicle of N-mono-hydroxyalkyl-meta-toluidine.

The preparation of the said dyestuffs is preferably carried out by coupling a diazotized arylamine with a primary arylamine which is capable of being coupled in the para-position, the resulting monoazo dyestuff being diazotized and coupled with an amine of the benzene series hydroxyalkylated in the amino group, all of the materials used being free from sulphonic and carboxylic groups.

In order to prepare these dyestuffs, the first component may be for example aniline, para-toluidine, alpha-naphthylamine or their substitution products, as for example para-nitraniline, meta-nitraniline, 2,4-dinitraniline, para-chloraniline and 4,5-dinitro-1-naphthylamine. The middle stage component may be for example aniline, meta-toluidine, 2-methoxy-5-methylaniline, para-xylidine and alpha-naphthylamine. Suitable final components are for example N-hydroxyethyl-meta-toluidine, hydroxyethylaminobenzene, 1-hydroxyethyl-normal-butylamino-2-methoxy-5-methylbenzene, N-dihydroxyethyl-meta-toluidine, N-hydroxyethylbenzylaniline, N-dihydroxypropylmeta-toluidine and N-di-(dihydroxypropyl)-aniline (corresponding to the formula

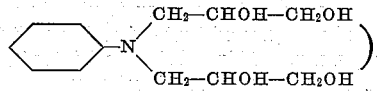

Corresponding compounds derived from other aromatic compounds than benzene and naphthalene also come into question, for example derivatives of anthracene, phenanthrene and the like. Instead of hydroxyethyl and hydroxypropyl groups also other hydroxyalkyl such as hydroxybutyl and like groups may be present in the components in question.

About one molecular proportion of each component or a slight excess of the coupling components is usually employed. Coupling is effected in acid solution, the acid reaction being produced by mineral acids or organic acids such as acetic acid.

The disazo dyestuffs according to this invention dye cellulose esters and ethers, as for example acetyl or nitro cellulose, for example valuable clear brown, red or violet shades and have a good affinity to the said fibres. The dyeings obtained possess a good fastness to light.

The following examples will further illustrate the nature of this invention but the invention is not restricted to these examples. The parts are by weight.

Example 1

138 parts of para-nitraniline in a mixture of 1000 parts of water and 250 parts of concentrated hydrochloric acid are diazotized with 74 parts of sodium nitrite and the solution of the diazo compound is added to a solution of 157 parts of alpha-naphthylamine in a mixture of 110 parts of concentrated hydrochloric acid and 4000 parts of water. The resulting monoazo dyestuff is worked up in the usual manner and suspended in 5000 parts of water, 200 parts of concentrated hydrochloric acid being added and then 65 parts of sodium nitrite dissolved in 200 parts of water whereby diazotization is effected, the whole being cooled by ice. When nitrite can only be slightly detected in the solution, the resulting diazo compound is added to a solution of 190 parts of 1-hydroxyethylamino-2-methoxy-5-methylbenzene in 110 parts of concentrated hydrochloric acid and 1500 parts of water with an addition of from 400 to 500 parts of sodium acetate. The coupling is completed after a few hours. The resulting dyestuff yields full wine-red dyeings on acetyl cellulose.

Example 2

138 parts of meta-nitraniline are diazotized in the usual manner with 69 parts of sodium nitrite, the resulting diazo compound being coupled with 112 parts of meta-toluidine dissolved in 2200 parts of 18 per cent hydrochloric acid. The resulting monoazo dyestuff is filtered by suction, carefully washed and suspended in 6000 parts of water while still moist. The suspension is acidified with 200 parts of concentrated hydrochloric acid and diazotized with 65 parts of sodium nitrite dissolved in 200 parts of water while cooling with ice. The diazo compound passes for the greater part into solution.

The solution of the diazo compound is allowed to flow in a thin stream into a solution of 170 parts of hydroxyethylethylaminobenzene and 600 parts of sodium acetate in 1500 parts of water. The coupling commences immediately and is completed after about 4 hours. The resulting dyestuff is filtered off by suction and washed. It dyes acetyl cellulose blue-red shades.

If 160 parts of 1-hydroxyethylamino-3-methylbenzene be employed instead of the said final component, a dyestuff is obtained which yields yellow-brown dyeings on acetyl cellulose.

Example 3

197 parts of aminoazobenzene are diazotized in the usual manner, the resulting diazo compound being coupled with 190 parts of dihydroxyethylaminobenzene dissolved with 110 parts of concentrated hydrochloric acid in 1000 parts of water with an addition of 400 parts of sodium acetate. The dyestuff obtained dyes acetyl cellulose brilliant yellow-red shades very fast to light.

Example 4

138 parts of para-nitraniline are diazotized as described in Example 2 and the resulting diazo compound is coupled with 112 parts of meta-toluidine. The resulting monoazo dyestuff is then diazotized and coupled with 1-hydroxyethylamino-2-methoxy-5-methylbenzene.

The resulting disazo dyestuff yields brown-violet dyeings on acetyl cellulose.

If 1-amino-2,5-dimethylbenzene be employed as the middle stage component and the diazo compound of the monoazo dyestuff obtained be then coupled with 1-hydroxyethylamino-2-methoxy-5-methylbenzene or 1-hydroxyethylamino-3-methylbenzene, dyestuffs are obtained which yield violet-brown or pure brown shades on acetyl cellulose.

What we claim is:

1. Dyestuffs free from sulphonic and carboxylic acid groups corresponding to the formula,

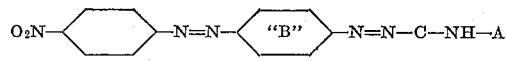

wherein the nucleus marked "B" is substituted by at least one methyl group, wherein C is selected from the group consisting of phenyl and toluyl radicals, and wherein A is a hydroxy alkyl group.

2. Dyestuffs free from sulphonic and carboxylic acid groups corresponding to the formula

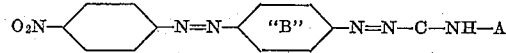

wherein the nucleus marked "B" is substituted by at least one methyl group, wherein C is selected from the group consisting of phenyl and toluyl radicals, and wherein A is a hydroxy ethyl group.

3. The dyestuff corresponding to the formula

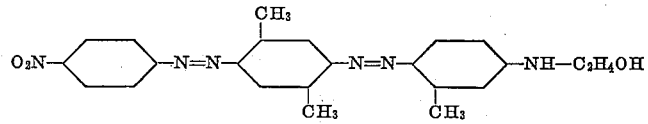

KARL HOLZACH.
BERND v. BOCK.
HEINRICH OHLENDORF.
ERICH BAUMANN.